United States Patent [19]

Jordan

[11] Patent Number: 4,638,978
[45] Date of Patent: Jan. 27, 1987

[54] HYDROPNEUMATIC CABLE TENSIONER

[76] Inventor: Larry B. Jordan, 10710 Archmont St., Houston, Tex. 77070

[21] Appl. No.: 761,585

[22] Filed: Aug. 1, 1985

Related U.S. Application Data

[63] Continuation-in-part of Ser. No. 516,102, Jul. 22, 1983, Pat. No. 4,540,159.

[51] Int. Cl.$^4$ .................... B25B 25/00; B66D 1/50
[52] U.S. Cl. .................... 254/228; 254/277; 254/386; 254/392
[58] Field of Search ............... 254/228, 272, 277, 286, 254/392; 92/143

[56] References Cited

U.S. PATENT DOCUMENTS

| 2,588,037 | 3/1952 | Orton | 242/47.5 X |
|---|---|---|---|
| 2,984,211 | 5/1961 | Schneider | 92/143 X |
| 3,120,157 | 2/1964 | Mello | 91/408 |
| 3,314,657 | 4/1967 | Prud'Homme et al. | 254/392 |
| 3,403,728 | 10/1968 | Richardson et al. | 254/277 X |
| 3,791,628 | 2/1974 | Burns et al. | 254/277 |
| 3,792,836 | 2/1974 | Bender | 254/386 X |
| 3,804,183 | 4/1974 | Duncan et al. | 254/277 X |
| 3,841,607 | 10/1974 | Larralde et al. | 254/392 |
| 3,912,227 | 10/1975 | Meeker et al. | 254/277 X |
| 4,145,959 | 3/1979 | Burden et al. | 92/8 |
| 4,540,159 | 9/1985 | Jordan | 254/228 |

FOREIGN PATENT DOCUMENTS

| 164528 | 8/1980 | Netherlands . |
| 12110 | of 1884 | United Kingdom . |
| 919768 | 2/1963 | United Kingdom . |

*Primary Examiner*—Stuart S. Levy
*Assistant Examiner*—Joseph J. Hail, III

[57] ABSTRACT

A hydropneumatic cable tensioner is comprised of an enclosed cylinder featuring a plurality of annular chambers. A fixed cable sheave is mounted to one end of the cylinder. A movable cable sheave is mounted to a piston rod connected to a piston which reciprocates in a piston bore chamber of the cylinder. Regulated compressed gas is connected to the outer accumulator chamber of the cylinder thereby exerting high pressure forces on oil found in the middle or high pressure oil chamber of the cylinder. Pressurized oil forces a piston to move outwardly thereby increasing the distance between the two sheaves and tensioning a cable and containment chamber within the piston rod. Restriction ports between the piston bore chamber and the containment chamber within the piston rod regulate movement of the piston and prevent uncontrolled acceleration should a cable failure occur.

8 Claims, 7 Drawing Figures 4,638,978

HYDROPNEUMATIC CABLE TENSIONER

CROSS REFERENCE TO RELATED APPLICATIONS

This application is a continuation-in-part of application, Ser. No. 516,102 filed July 22, 1983 for "Hydropneumatic Cable Tensioner", now U.S. Pat. No. 4,540,159.

FIELD OF THE INVENTION

The invention relates to the field of devices capable of maintaining tension on a cable or a wire rope line particularly for ship board applications. In the event of cable failure, the device is so constructed as to prevent sudden unrestrained movements which could damage the device.

DESCRIPTION OF THE PRIOR ART

In various applications involving cable lines subjected to varying forces, it is desirable to install a tensioning apparatus to prevent the forces exerted on the cable from exceeding a predetermined limit.

The prior art reveals that pneumatic pressure and hydraulic pressure have both been used to actuate such tensioning devices, a potential problem with cable tensioning devices using pneumatic pressure is that in the event of a cable failure, the force is exerted by the suddenly expanding pneumatic fluid, unless somehow restrained, can cause considerable damage to the tensioner and surrounding equipment.

Hydraulic powered cable tensioning devices do not suffer from the problem of unrestrained acceleration of a piston in the cylinder in the event of a cable failure. The Kerle, British Pat. No. 12,110, issued Sept. 6, 1884, illustrates a completely hydraulic cable tensioning device. In the Kerle device, there is no problem with unrestrained acceleration of the piston in the event of a cable failure because the piston cannot move in the cylinder any faster than the liquid can enter or leave the cylinder. The same can be said for the W. R. Mello, U.S. Pat. No. 3,120,157 issued Feb. 4, 1964, since it incorporates the completely hydraulic piston drive system. These prior art hydraulically actuated devices did not disclose means for preventing sudden violent and destructive movements of the piston in the event of a cable failure because the hydraulic system, by design, precluded such problems by limiting flow of hydraulic fluid to and from the cylinder thereby effectively controlling piston movement independent of cable tension exerted on such device.

The prior art also reveals cable tensioning mechanisms that are actuated by pneumatic pressure. The P. A. Orton, Sr., U.S. Pat. No. 2,588,037 issued Mar. 4, 1952, dicloses a pneumatically actuated piston in the cylinder. The cylinder is equipped with an air vent located on the cylinder wall on the opposite side of the piston from the pneumatic pressure supply. Although, as the inventor claims, the size of the air vent may be varied to effect the amount of dampening force applied to the piston, such dampening forces may not be sufficient to reduce piston speed in the event of a sudden load removal due to a cable failure.

More recent prior art devices have incorporated the use of a high pressure gas as the motive fluid in a cable tensioning device as well as restriction of a combined air/oil mixture downstream of a piston as a means of preventing uncontrolled piston acceleration in the event of a cable failure. Such devices require the use of external accumulators to hold a sufficient supply of high pressure gas to facilitate the functioning of the device. This type of device also requires the use of an external air/oil reservoir into which the air/oil mixture is displaced from the cylinder upon outward movements of the piston. Such devices requiring a multiplicity of high pressure reservoirs are heavy and tend to take up valuable space and require significant amounts of the interconnecting piping and valving. The additional space and weight are at a premium as on offshore drilling rigs, for example.

The J. W. Prud'homme hydropneumatic cable tensioner, U.S. Pat. No. 3,314,657, issued Apr. 18, 1967 deals with pneumatically actuated cable tensioners which describe attempts to prevent sudden acceleration of the piston in the event of cable failure. The Prud'homme device prevents sudden piston acceleration after a cable failure by displacement of an air/oil mixture through the combination of a spring loaded valve and an opening both located in the cylinder walls and acting to restrict air/oil flow with a low pressure gas/oil reservoir which is fabricated around said cylinder. Use of the Prud'homme cable tensioner requires the incorporation of separate high pressure gas supply tanks externally connected to the device, to act as accumulators, in order for the device to properly respond to changes in cable tension. Furthermore, in order to accomodate ball check valves that permit flow between a low pressure air/oil reservoir and the cylinder bore, the diameter the low pressure air/oil reservoir must be sufficiently increased to provide space for mounting such check valves. As a result, the device becomes unusually unweildly and heavy.

It is therefore an object of this invention to provide a hydropneumatic tensioner of compact design and reduced weight which will not require the connection of external high pressure gas accumulator vessels.

Another object of the invention is to provide a hydropneumatic cable tensioner which responds to a sudden cable failure by controlled movements of a piston with a cylinder.

Yet another object of the invention is to provide a hydropneumatic cable tensioner which restricts sudden movements of the device using a minimum of moving parts thereby tending to improve the operating life of the device.

SUMMARY OF THE INVENTION

The present invention relates to a new and improved apparatus for maintaining tension on a cable or a wire rope line. The apparatus maintains cable tension by varying the distance between a pair of sheaves around which a cable is strung. The device consists of a fixed sheave and a movable sheave connected to a piston in a cylinder featuring a plurality of interconnected annular chambers. The outer chamber, or accumulation chamber, contains a supply of compressed gas, the middle chamber contains oil pressurized by the gas from the outer chamber, and the central chamber may act as a containment chamber or house the piston assembly which effectively controls tension by positioning a sheave connected to the end of the piston rod. During normal operation and in the event of cable failure, the device prevents uncontrolled acceleration of the piston by restricting flow of a lubricant through the chamber formed in front of the piston. The device contains a means for slowing the piston before it reaches its fully retracted position in the central chamber.

DETAILED DESCRIPTION OF THE DRAWINGS

DETAILED DESCRIPTION OF THE PREFERRED EMBODIMENT

Figure 1:
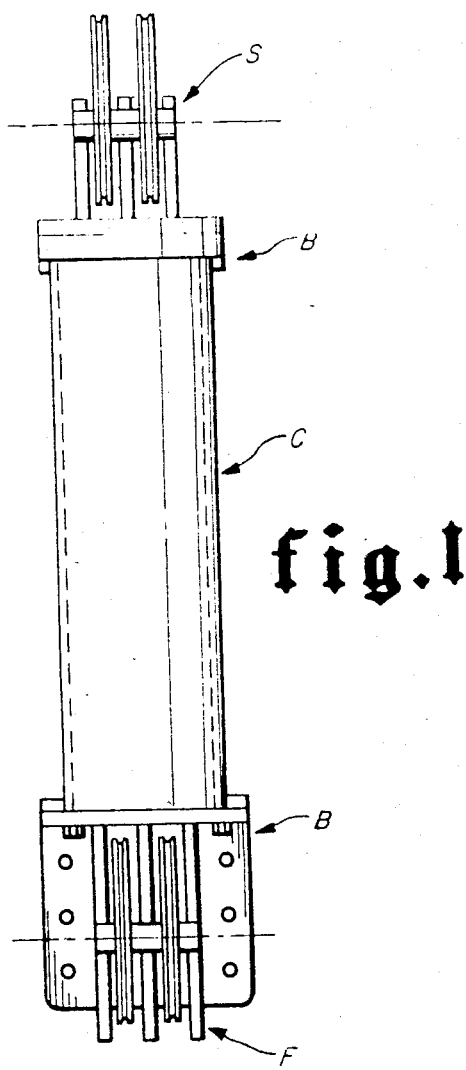
FIG. 1 is an elevation of a hydropneumatic cable tensioners with a sheave housing removed.
Figure 2:
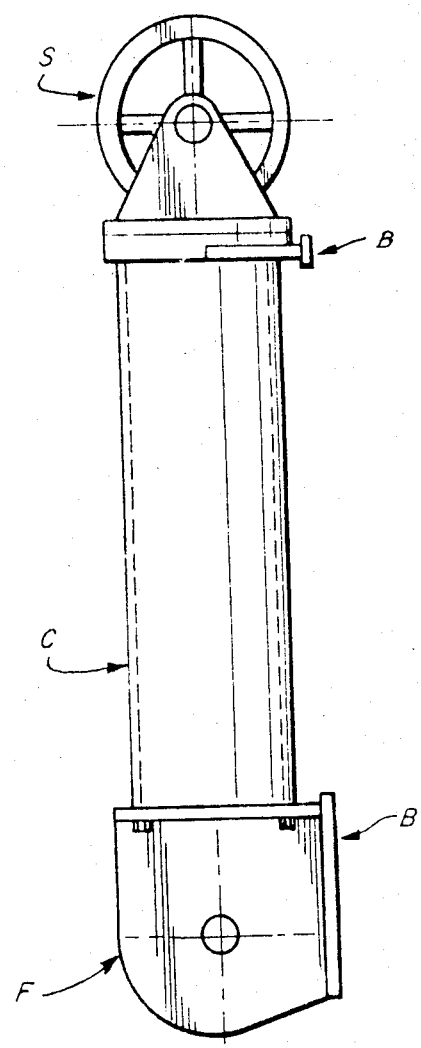
FIG. 2 is a side elevation of the structure illustrated in FIG. 1.
Figure 3:
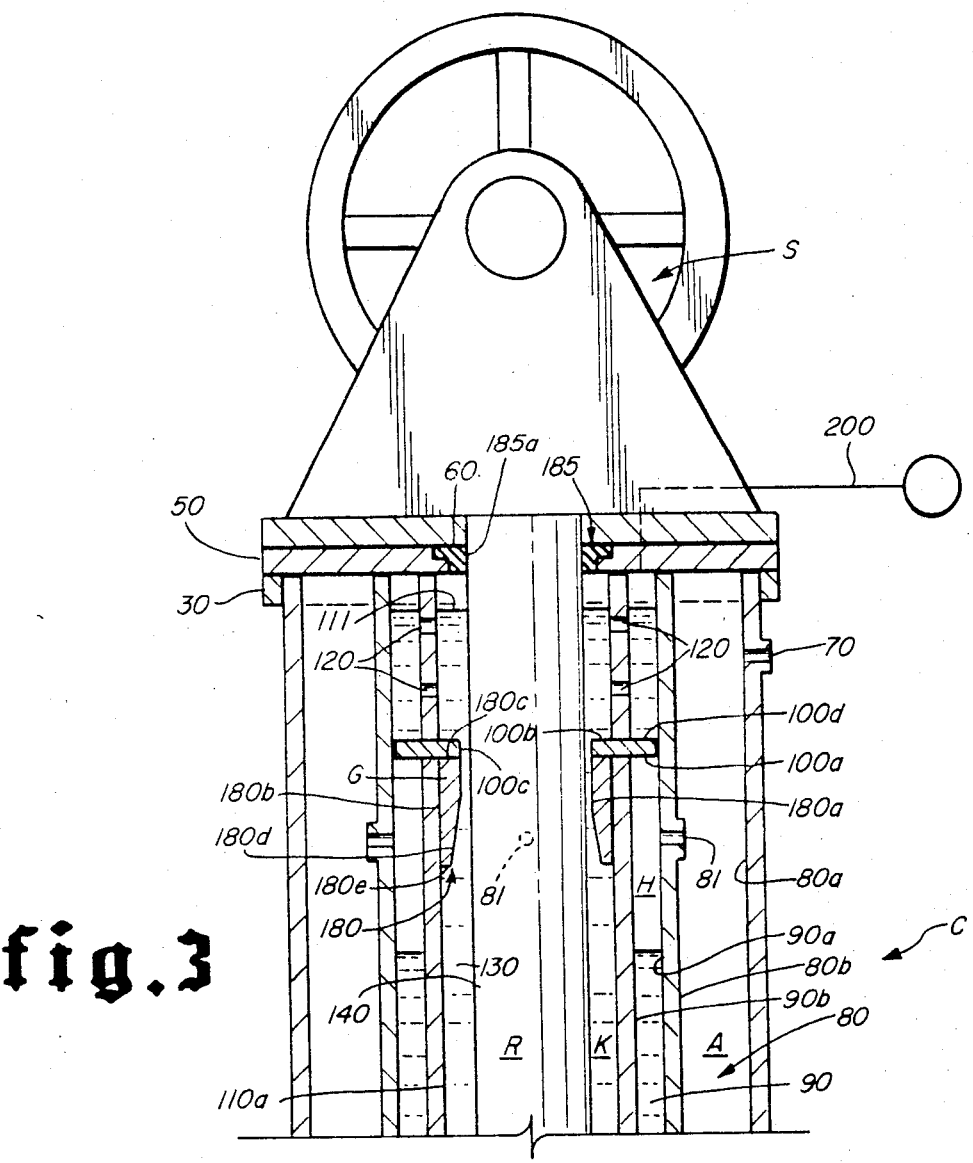
FIG. 3 is a cross-section on a longitudinal medium plane through the structure shown in FIG. 1 with the piston rod fully retracted.

Referring to FIG. 1 of the drawings, the basic components of the hydropneumatic cable tensioner are shown to be: a base B; a cylinder C; a first cable sheave F; a second cable sheave S. Referring to FIG. 3, other basic components of the invention are illustrated such as a piston P; a piston rod R; restriction means G and piston sealing means J.

The cylinder C of the tensioner is attached to a fixed object such as a drilling ship or semi-submersible drilling rig, via base B. The cylinder C is constructed of a high strength steel or equivalent material to withstand operating pressure encountered during the operation of the tensioner. Within cylinder C on FIG. 3, starting at its longitudinal axis, there are several interconnected annular chambers: piston bore chamber K; high pressure oil chamber H; and accumulator chamber A. Cylinder C, also known as 10, is flanged on both ends. Flange 20 is connected at the lower end of cylinder 10 and flange 30 is connected at the upper end of cylinder 10. First enclosure means otherwise known as end plate 40 is bolted to flange 20 with appropriate gasket and bolts and nuts (not shown) thereby effectively enclosing the lower end of cylinder 10. Second enclosure means otherwise known as end plate 50 is bolted to flange 30 with appropriate gasket, nuts and bolts (not shown) effectively sealing the upper end of cylinder 10 except for an opening 60 in end plate 50 to accomodate piston rod R. At the upper end of cylinder 10, a connection 70 is provided in the cylinder wall in order to admit compressed gas into the cylinder 10.

The connection 70 allows compressed gas to enter the accumulator chamber A, also shown as 80, within cylinder 10. Accumulator chamber 80 is an annular space which is defined by vertical cylindrical surfaces 80a and 80b. End plate 40 and end plate 50 respectively define the lower and upper boundaries of accumulator chamber 80. There are four equally spaced radial ports 81 located in accumulator chamber 80 toward the upper end of surface 80b and equally spaced from end plate 50.

The ports 81 permit fluid communication at a restricted rate between accumulator chamber 80 and high pressure oil chamber H, also called 90.

The high pressure oil chamber 90 is an annular chamber defined by vertical cylindrical surfaces 90a and 90b. The high pressure oil chamber extends from end plate 40 to surface 100a of transversely mounted disc 100 and contains an interface of air and oil. At the lower end of high pressure oil chamber 90 on surface 90b, there are a plurality of radial ports 91 equally spaced from each other and from end plate 40 which permit fluid communication at a restricted rate between high pressure oil chamber 90 and piston bore chamber K (FIG. 3A), also called 110. The working fluid in high pressure oil chamber 90 is approximately 100 gallons of synthetic non-flammable lubricant (hereinafter "oil") and operates at pressures between 2500-3000 PSIG depending on supply pressure to accumulator chamber 80. The common wall between accumulator chamber 80 and high pressure oil chamber 90 is defined by surfaces on 90a and 80b. Similarly, the common wall between piston bore chamber 110 and high pressure oil chamber 90 is defined by surfaces 110a and 90b.

Piston bore chamber 110 is defined by cylindrical surface 110a and extends from end plate 40 on its lower end to end plate 50 on its upper end. Transversely mounted disc 100 which contains a bore 100b, said bore having a smaller diameter than piston bore chamber 110 defines a radial lip 100c within said piston bore chamber 110. Piston bore chamber 110 encompasses low pressure subchamber L also called 130 which is defined as that portion of piston bore chamber 110 between piston P and restriction means G and is always full of oil. The oil in the low pressure oil subchamber 130 is the same as the oil in the high pressure oil chamber 90 and operates in a range of pressures of 15-50 PSIG depending on the velocity of piston P. Above annular lip 100c, low pressure subchamber 130, see FIG. 3, also includes a containment section 111 which comprises the annular space bounded by surfaces 90a, 90b, 100d and end plate 50 as well as the space bounded by surface 110a from surface 100d to end plate 50. A plurality of equally spaced radial ports 120 extending radially through piston bore 110 located between surface 100d and end plate 50, are sized to permit fluid communication at a restricted rate between the cylindrical segment of piston bore chamber 110 and the annular space.

Piston rod R, also called 140, reciprocates within piston bore chamber 110. Second cable sheave S, a device well known in the art, is connected by means of a suitable base plate (not shown) to the end of piston rod 140 which protrudes through opening 60 of end plate 50. The other end of piston rod 140 consists of a reduced diameter piston mounting section 141 thereby creating lip 141a. The reduced diameter piston mounting section 141 defines a plurality of circumferential grooves of which grooves 141b, 141c and 141d are shown. Piston rod R is further defined by an end section 142. The end section is formed by radial surface 142a, cylindrical surface 142b and end surface 142c. A stop ring 143 is mounted at the bottom of piston bore chamber 110. Inner surface 143a of stop ring 143 is of a slightly larger diameter than cylindrical surface 142b. A gap remains between surface 142c at the end of piston rod 140 and end plate 40 at the same time as radial surface 142a abutts stop ring top surface 143b when piston rod 140 is fully retracted in piston bore chamber 110. Oil displaced through the narrow gap between inner surface 143a and cylindrical surface 142b acts to retard piston movement as it reaches a fully retracted position.

Figure 3A:
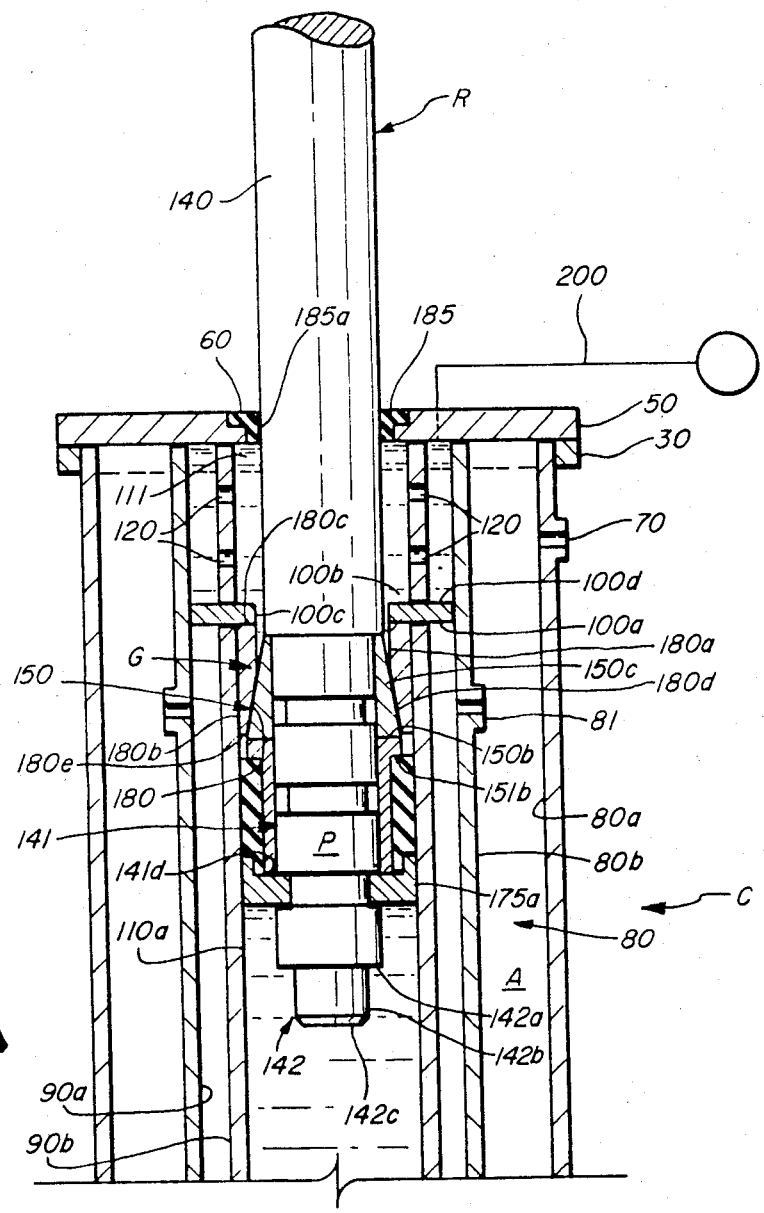
FIG. 3a is a cross-section on a longitudinal median plane through the structure shown in FIG. 1 with the sheaves being removed and the piston rod fully extended.
Figure 3A:
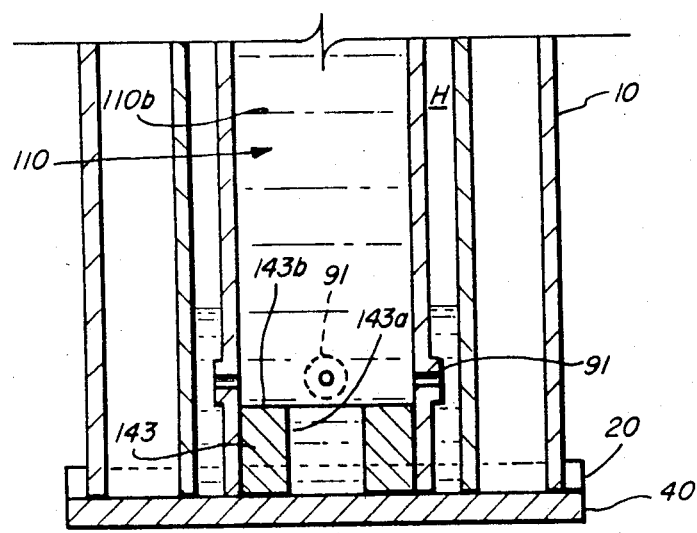

The piston P which, as seen in FIGS. 3 and 3A, is an assembly of parts mounted on the reduced diameter piston mounting section 141 of piston rod 140, cooperates with piston sealing means J to form an assembly which effectively divides piston bore chamber 110 into a high pressure segment 110b which is defined as the volume between plate 40 and piston P and is always full of high pressure oil, and low pressure subchamber 130 which is defined as the volume between piston P and restriction means G and is always full of low pressure oil. Piston P is composed of several components. A conical frustum shaped support bushing 150 is fitted over the reduced diameter piston mounting section 141 of piston rod 140 until end surface 150a of support bushing 150 is in contact with lip 141a. A resilient ring 160 mounted in circumferential groove 141b may be used to seal between the reduced diameter piston mounting section 141 of piston rod 140 and support bushing 150, as desired. Piston seal bushing 151 is mounted over the reduced diameter piston mounting section 141 of piston rod 140 until end surface 151a of piston seal bushing 151 is in contact with end surface 150b of support bushing 150. A resilient ring 160a mounted in circumferential groove 141c may be used to prevent fluid leakage between the reduced diameter piston mounting section 141 and piston seal bushing 151 as desired. Piston seal bushing 151 also contains radial lip 151b which secures packing 170 (of a type well known in the art). The assembly of support bushing 150 and piston seal bushing 151 as well as the packing 170 are all retained in place on the reduced diameter piston mounting section 141 of piston rod 140 via split ring 175 mounted in circumferential groove 141d. Split ring 175 has an outer circumferential surface 175a which is of a diameter slightly smaller than the bore defined by cylindrical surface 110a thereby permitting split ring 175 to function not only as a packing retainer, but also as an integral component of the piston P. Circumferential groove 141d is so disposed along reduced diameter piston mounting section 141 of piston rod 140 such that when radial surface 142a abuts stop ring surface 143b, split ring 175 does not cover ports 91.

Restriction means G effectively restricts fluid flow between low pressure subchamber 130 and containment section 111 which in turn restricts movement of piston P. Oil displaced into containment section 111 compresses a gas initially present in the containment section 100 and forces fluid through ports 120. Both the compressive effect and the restriction afforded by ports 120 restrict piston P velocity. Restriction means G, in the embodiment of FIGS. 1-3A, encompasses an annular ring 180. Inner cylindrical surface 180a is in sliding contact with piston rod 140 thereby guiding piston rod 141. Outer surface 180b is in contact with cylindrical surface 110a. Movement of annular ring 180 is prevented by a bolted connection (not shown) between its upper surface 180c and radial lip 100c. Inner tapered surface 180d located between cylindrical surface 180a and end surface 180e accepts tapered surface 150c of support bushing 150 thereby stopping further outward movement of piston P. Low pressure oil may flow along piston rod 140 in the clearance between surface 180a and piston rod 140 in both directions depending upon the direction of motion of piston P thereby restricting piston P velocity.

Oil that is displaced through the clearance between piston rod 140 and inner cylindrical surface 180a of annular ring 180 is prevented from escaping along piston rod 140 through end plate 50 by virtue of wiper seal 185 mounted in end plate 50 around opening 60. Inner surface 185a of wiper seal 185 is in sliding contact with piston rod 140 thereby preventing escape of fluids along piston rod 140 as it reciprocates in the piston bore chamber 110.

A relief valve 200 of a type well known in the art is mounted in end plate 50 and communicates with the containment section 111 of the low pressure subchamber 130.

Figure 5:
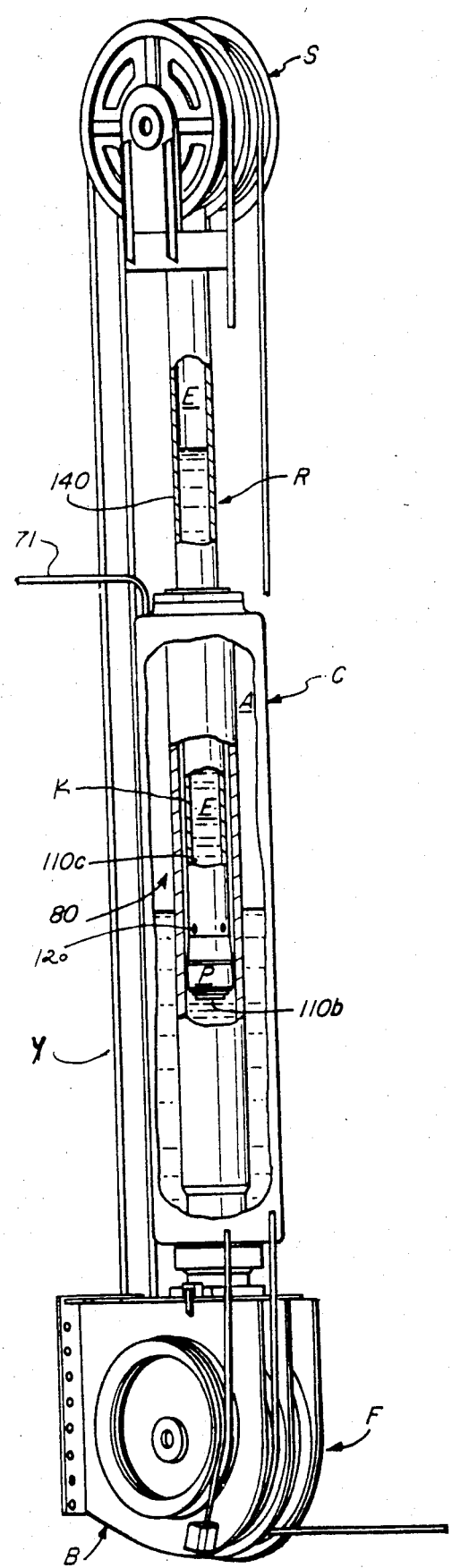
FIG. 5 is a schematic elevation, partly in section, showing the embodiment of this invention wherein the core of the piston rod itself serves as the containment chamber of the tensioner.
Figure 6:
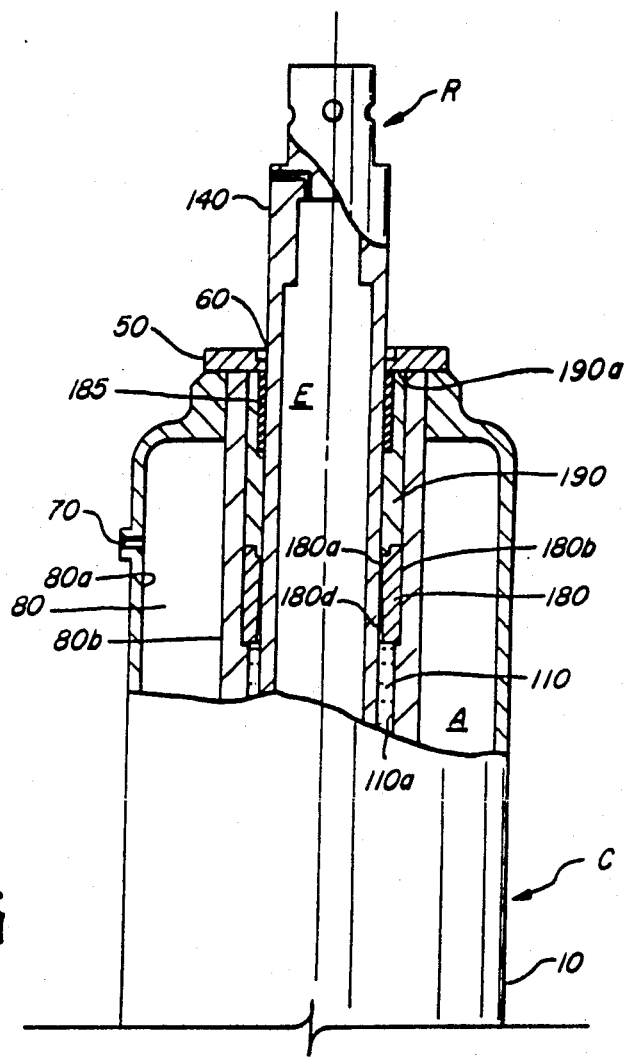
FIG. 6 is an elevation, with the piston fully retracted, sectioned to show the restriction means ports of the embodiment of FIG. 5.
Figure 6:
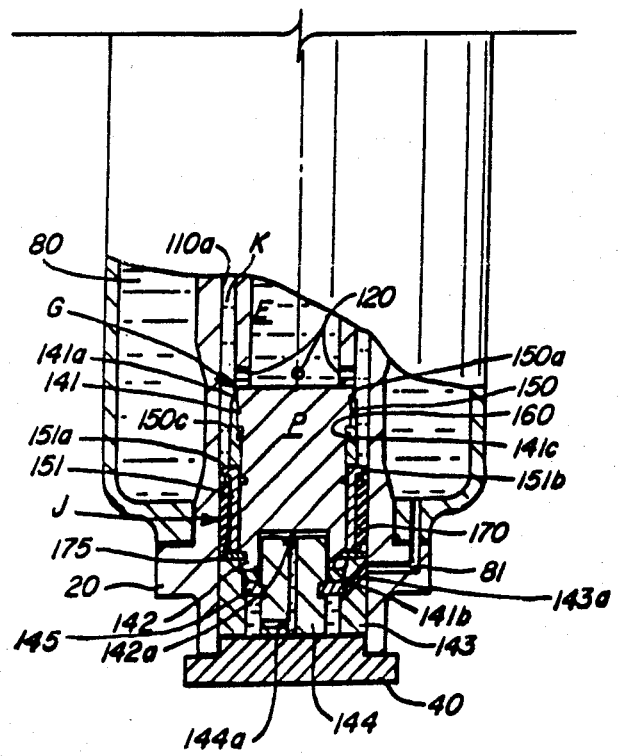

Referring now to FIG. 5 and FIG. 6 of the drawings, the cylinder C of the tensioner is attached to a fixed object such as a drilling ship or semi-submersible drilling rig, via base B. The cylinder C is constructed of a high strength steel or equivalent material to withstand operating pressure encountered during the operation of the tensioner. Within cylinder along its longitudinal axis, there are three interconnected chambers: piston bore chamber K; containment chamber E; and accumulator chamber A. Insofar as possible where the parts of the embodiment depicted in FIGS. 5 and 6 are obviously the same as depicted in FIGS. 3 and 3A the numbering convention has been kept the same. Cylinder C, also known as 10, is shown as being flanged on both ends even though a threaded connection may be possible. Flange 20 is attached to the lower end of cylinder 10, either by bolts (not shown) or threads. First enclosure means otherwise known as end plate 40 is bolted to flange 20 with appropriate gaskets and bolts and nuts (not shown) thereby effectively enclosing the lower end of cylinder 10 and containment chamber E. Second enclosure means otherwise known as end plate 50 is bolted to cylinder 10 with appropriate gasket, nuts and bolts and also bolted to the upper end of an inner cylinder (described hereinafter) which forms the outter wall of the piston bore chamber K and the inner wall of the accumulator Chamber A thus effectively securing and sealing the upper end of cylinder 10 except for an opening 60 in end plate 50 to accomodate piston rod R.

As an important advantageous feature of this invention the cylinder 10 can be easily removed from the inner cylinder describing the outer wall of the piston bore which may generally incorporate flange 20. Thus, in case cylinder 20 becomes damaged, it can be replaced without dismantling the entire tensioner or disassembly of the piston P.

At the upper end of cylinder 10, a connection 70 is provided in the cylinder wall in order to admit compressed gas into the cylinder 10. The connection 70 allows compressed gas, usually air, to enter the accumulator chamber A, also known as 80, within cylinder 10. Accumulator chamber 80 is an annular space which is defined by vertical cylindrical surfaces 80a and 80b. Near the lower end of accumulator chamber 80 is a port 81 permit fluid communication at a restricted rate between accumulator chamber 80 and piston bore chamber K, also called 110. Even though a single port 81 is shown, a plurality of ports, especially form, is preferred.

The working fluid in the cable tensioner of this invention is preferably a synthetic non-flammable lubricant (hereinafter "oil") and operates at pressures from about atmospheric to 3000 psig supply pressure to the accumulator chamber 80. The common wall between accumulator chamber 80 and piston bore chamber 110 is defined by surfaces on 110a and 80b. Piston bore chamber 110 is defined by the cylindrical surface 110a. That portion of piston bore chamber 110 between piston P and the bottom of the cable tensioner (end plate 40) and is always full of oil fed from the accumulator chamber 80 through port 81 at substantially the same pressure as within the accumulator chamber 80 to urge the piston P forward. A restriction means G in the form of a plurality of equally spaced radial ports 120 extending radially through piston rod R located proximate the piston P are sized to premit fluid communication at a restricted rate between the containment chamber E and piston bore chamber 110.

Piston rod R, also called 140, reciprocates within piston bore chamber 110. Second cable sheave S, a device well known in the art, is connected by means of a suitable means well known to those skilled in the art (not shown) to the end of piston rod 140 which protrudes through opening 60 of end plate 50. The other end of piston rod 140 consists of a reduced diameter piston mounting section 141 thereby creating lip 141a. The reduced diameter piston mounting section 141 defines one circumferential grooves, one being shown as 141b. Piston rod R is further defined by an end section 142. The end section is formed by cylindrical indentation 142a. An annular clyndrical stop ring 143, shaped like a donut, is mounted at the bottom of piston bore chamber 110 and of sufficient inner diameter of a central bore to accept entry by a cylindrical plug 144. A passage 143a is drilled in stop ring 143 to communicate with piston bore chamber K at a point below the most retracted position of the piston sealing means J and allow the restricted flow of oil from the piston bore chamber 110 and through port 81 into the accumulation chamber 80 when piston rod 140 is fully retracted in piston bore chamber 110. Oil displaced through the passage 143a and port 81 acts to retard and cushion piston movement as it reaches a fully retracted position. The cylinder plug 144 is secured in indentation 142a by a split ring connected by appropriate fastners such as a bolt or the like (not shown) attached to an end section 142. A passageway 144a in plug 144 allows fluid to flow from piston bore cylinder K to erect pressure on surface 142a.

The piston P which, as seen in FIG. 6, is an assembly of parts mounted on the reduced diameter piston mounting section 141 of piston rod 140, cooperates with piston sealing means J to form an assembly which effectively divides piston bore chamber 110 into a high pressure segment 110b which is full of high pressure oil, and low pressure segment 110c of the containment chamber E which is defined as the volume between piston P and upper end of rod R which contains low pressure oil and air during normal operations of the tensioner of this invention.

Piston P is composed of several components. A conical frustum shaped support bushing 150 is removably fitted over the reduced diameter piston mounting section 141 of piston rod 140 until end surface 150a of support bushing 150 is in contact with lip 141a. A resilient ring 160 may be mounted in a circumferential groove 141c to seal between the reduced diameter piston mounting section 141 of piston rod 140 and support bushing 150, as desired. Piston seal bushing 151 is mounted over the reduced diameter piston mounting section 141 of piston rod 140 until end surface 151a of piston seal bushing 151 is in contact with end surface of support bushing 150. More resilient rings may be mounted in additional circumferential grooves to prevent fluid leakage between the reduced diameter piston mounting section 141 and piston seal bushing 151 as desired. Piston seal bushing 151 also contains radial lip 151b which secures packing 170 (of a type well known in the art) which acts as piston sealing means J. The assembly of support bushing 150 and piston seal bushing 151 as well as the packing 170 are all retained in place on the reduced diameter piston mounting section 141 of piston rod 140 via split ring 175 mounted in circumferential groove 141b preferably bolted in place. Split ring 175 has an outer circumference which is of a diameter slightly smaller than the bore defined by cylindrical surface 110a thereby permitting split ring 175 to function not only as a packing retainer, but also as an integral component of the piston P. Split ring 175 does not cover port 81 when the piston is fully retracted.

Restriction means G effectively restricts fluid flow between low pressure segment of the piston bore chamber 110c and the containment chamber E which in turn restricts sudden movement of piston P in case of sudden loss of tension in cables Y, FIG. 5. Oil displaced through port 120 into containment chamber E compresses a gas, usually air, initially present in the containment chamber E. Both the compressive effect and the restricted flow afforded by ports 120 restrict piston P velocity during outward extension of the rod R through the opening 60. Should the cables break, total ejection of the Rod R and piston P is prevented by the upper flange 50 in coordination with an annular ring 180. Inner cylindrical surface 180a faces piston rod 140 thereby guiding piston rod 140. Outer surface 180b is in contact with cylindrical surface 110a. Movement of annular ring 180 is prevented by a seal bushing 190 having its upper surface 190a held in place by flange 50. A wiper seal 185, carried by seal bushing 190 and held by flange 50, prevents leakage of the oil.

Inner tapered surface 180d located between cylindrical surface 180a and end of ring 180 accepts tapered surface 150c of support bushing 150 thereby stopping outward movement of piston P.

Greater detail of certain parts of the above-identified embodiment shown in FIGS. 5 and 6 can be had by reference to the corresponding parts of FIGS. 3 and 3A and the discussion thereof which is hereby incorporated into this discussion of such later embodiment.

Figure 4:
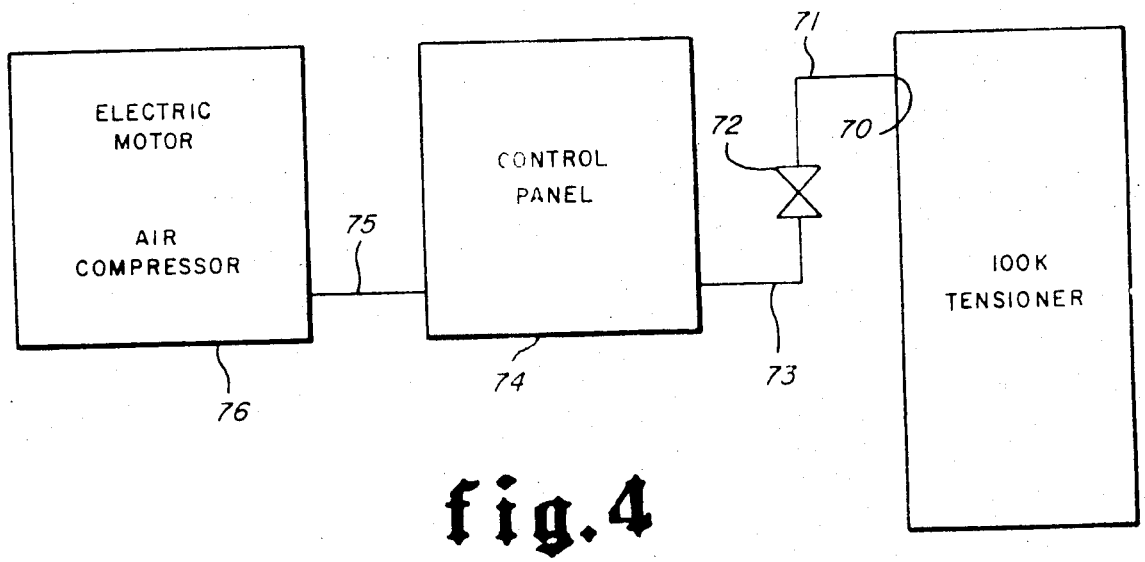
FIG. 4 is a schematic view of the hydropneumatic cable tensioner illustrating auxillary equipment used to produce a regulated gas supply to the tensioner.

FIG. 4 shows schematically the connection of a regulated gas supply to either embodiment the tensioner. Compressed gas is provided by a motor driven compressor 76 or any alternative compressed gas source and is connected via conduit 75 to a control panel 74. Control panel 74 contains regulation means of a type well known in the art to restrict supply pressures to the tensioner to a maximum of 3000 PSIG. The control panel 74 is connected to the tensioner via conduit 73 which is connected to a valve 72 which is in turn connected to connection 70 on cylinder C by way of conduit 71. Several tensioners may be connected to control panel 74.

The tensioner is placed in operation by reaving a cable Y as seen in FIG. 5 around first cable sheave F and second cable sheave S and finally to a load (not shown). In a typical application on board a ship, tension on the cable may vary with movements of the ship on the waterline. In the event of a decrease in tension on the cables, pneumatic pressure exerted by the compressed gas found in accumulator chamber 80 is exerted on the oil in high pressure oil chamber 90 (FIGS. 3 or 3A) or the piston bore chamber 110 (FIGS. 5 or 6)

through ports 81. When slack develops in the cable, pneumatic pressure acting on the oil forces the oil into the high pressure segment 110b of piston bore chamber 110 thereby exerting a force on the piston P. Movement of high pressure oil into piston bore chamber 110 acts to lubricate surface 110a to prevent friction damage to split ring 175. As a result of such pressure and slackening of tension on the cables, piston P forces piston rod R to move outwardly by displacing oil from low pressure subchamber 130 or segment 110c through the restriction means G. As a result of said displacement of oil containment section 111 in FIGS. 3 and 3A, or containment chamber E in FIGS. 5/6, a gas phase is compressed. Such compression along with the restriction to flow provided by ports 120 effectively combine to control piston speed. One or more such ports 120 are useful but four are preferred. Outward movement of piston rod 140 increases the distance between first cable sheave F which is stationary and second cable sheave S which is mounted on the end of piston rod 140 thereby taking up the slack.

If the tension suddenly increases on the cable, the tensioner will compensate by the movement of second cable sheave S closer to first cable sheave F. To acomplish this movement, the additional tension exerted on the cable will force the piston P to move toward end plate 40 which in turn will draw oil from containment section 111 or containment chamber E and simultaneously displace some high pressure oil from high pressure segment 110b of piston bore chamber 110 through ports 91 and/or 143a and 81, depending upon the embodiment involved back thereby compressing the gas in the accumulator chamber 80. In either direction, in order for piston P to move, fluid must be displaced through restricted openings.

The rate of movement of piston P in either direction is limited by the rate at which oil can be displaced through the openings. One skilled in the hydraulic art taking into consideration the dimensions of the chambers, the tension, the desired maximum piston speed, the loads exerted on the piston by the cable, the physical properties of the fluids involved and allowing for appropriate pressure drops can readily calculate the required open areas for ports 81, 91, 120 and in the case of the embodiment shown in FIGS. 3 and 3A, the open area between piston rod 140 and surface 180a of annular ring 180.

Should a cable failure occur which would immediately remove all the load on the tensioner, ports 81, 91, 120 and the gap between piston rod 140 and annular ring 180, when applicable, are sized so as to prevent sudden and uncontrolled acceleration of piston P. In the event of a sudden loss of load, piston P will be restricted to movement at a safe speed whereupon the piston will reach maximum extension when conical frustum shaped support bushing 150 contacts annular ring tapered surface 180d.

The foregoing disclosure and description of the invention are illustrative and explanatory thereof, and various changes in the size, shape and materials, as well as in the details of the illustrated construction may be made without departing from the spirit of the invention.

What is claimed is:

1. A hydropneumatic cable tensioner comprising:
    a base;
    a cylinder mounted on said base, said cylinder comprising an accumulator chamber and a piston bore chamber;
    a first enclosure means for enclosing a first end of said cylinder;
    a first cable sheave mounted to said first enclosure means;
    a second enclosure means for enclosing a second end of said cylinder;
    a piston rod comprising a first end extending within said piston bore chamber and a second end extending outside said cylinder through said second enclosure means, wherein said first end of said piston rod has a reduced diameter piston mounting section which forms a shoulder on said piston rod;
    a second cable sheave mounted on said second end of said piston rod;
    a piston comprising a conical frustum shaped support bushing removably fitted onto said reduced diameter piston mounting section and butted up to said shoulder on said piston rod, wherein said piston is reciprocable within said piston bore chamber;
    a piston sealing means which in cooperation with said piston divides said piston bore chamber into a low pressure segment above said piston sealing means and a high pressure segment below said piston sealing means;
    a first ported restriction means comprising a port communicating between said piston bore chamber and said accumulator chamber for controlling oil flow between said piston bore and accumulation chambers thereby limiting piston velocity in the event of a sudden change in cable tension, said piston bore chamber being ported to said accumulator chamber between said first closure means and said piston when said piston is fully retracted within said piston bore chamber proximate said first closure means;
    a containment chamber within said piston rod for containing an initial charge of gas and oil;
    a second ported restriction means comprising a port communicating between said piston bore chamber and said containment chamber for controlling oil flow between said piston bore and containment chambers thereby limiting piston velocity in the event of a sudden change of cable tension, said port being adjacent said piston;
    an annular ring fitted within said piston bore chamber adjacent said second closure means having an inner face positioned around said piston rod adapted to receive said piston to prevent further movement of said piston toward said second closure means; and
    means for regulating the pressure within said accumulator chamber to regulate the pressure exerted on said piston to thereby control the movement of said piston and piston rod and the force applied thereby.

2. The cable tensioner of claim 1, wherein said piston further comprises:
    a piston seal bushing fitted over said reduced diameter piston mounting section abutting said support bushing and covering a groove on said reduced diameter piston mounting section of said piston rod; and
    securing means mounted in another groove on said reduced diameter piston mounting section for retaining said piston sealing means onto an axial lip of said seal bushing and for retaining said seal bushing against said support bushing.

3. The cable tensioner of claim 2, wherein said piston sealing means further comprises:

a plurality of packing rings mounted on said lip of said seal bushing; and a resilient o-ring mounted in said groove of said reduced diameter section of said piston rod covered by said seal bushing.

4. The cable tensioner of claim 1, wherein said annular ring further comprises:

an inner tapered surface, said tapered surface to accomodate said conical frustum shaped support bushing of said piston on outward movement of said piston resulting in the application of a combination of longitudinal and oblique forces applied to said conical frustum shaped support bushing effectively preventing further outward movement of said piston.

5. The cable tensioner of claim 3 or 4, wherein said first ported restriction means further comprises:

four radial equally spaced ports defined by a common wall between said accumulator chamber and said piston bore chamber, and sized as to restrict flow between said piston bore chamber and said accumulator chamber thereby controlling piston velocity.

6. The cable tensioner of claim 5, wherein said second ported restriction means further comprises:

four radial equally spaced ports defined by a common wall between said piston bore chamber and said containment chamber and sized so as to restrict flow between said piston bore chamber and said containment chamber thereby limiting piston velocity.

7. The cable tensioner of claim 6, wherein said piston bore chamber comprises:

an annular stop ring mounted to said first enclosure means, said stop ring further including a central bore on the same axis as said piston bore chamber and said piston rod further comprises:

a plug, said plug located between said reduced diameter piston mounting section and the inner end of said piston rod, said plug defining a cylindrical surface disposed to reciprocate within said central bore of said stop ring when said piston reaches its fully retracted position, whereupon high pressure oil is displaced from between said central bore of said stop ring and said cylindrical surface of said piston rod thereby reducing the velocity of said piston rod before said step on said piston rod impacts said stop ring.

8. The cable tensioner of claim 7 wherein said second enclosure means further comprises:

a resilient seal located within said second enclosure means fitted around said piston rod to prevent escape of fluids from said cylinder.

* * * * *